(12) United States Patent
Han et al.

(10) Patent No.: US 7,702,100 B2
(45) Date of Patent: Apr. 20, 2010

(54) KEY GENERATION FOR ADVANCED ENCRYPTION STANDARD (AES) DECRYPTION AND THE LIKE

(75) Inventors: Wei Han, Beaverton, OR (US); Yoshita Yerramilli, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 961 days.

(21) Appl. No.: 11/425,273

(22) Filed: Jun. 20, 2006

(65) Prior Publication Data

US 2008/0019504 A1 Jan. 24, 2008

(51) Int. Cl.
*H04L 9/28* (2006.01)
*H04L 9/06* (2006.01)

(52) U.S. Cl. ............... 380/28; 380/29; 380/44; 380/46

(58) Field of Classification Search ............... 380/44, 380/28, 29, 46
See application file for complete search history.

(56) References Cited

U.S. PATENT DOCUMENTS

| | | | |
|---|---|---|---|
| 6,891,950 B1 * | 5/2005 | Oomori et al. ............ | 380/44 |
| 7,106,860 B1 * | 9/2006 | Yu et al. .................. | 380/37 |
| 7,257,229 B1 * | 8/2007 | Leshem .................. | 380/277 |
| 7,283,628 B2 * | 10/2007 | Stein et al. .............. | 380/29 |
| 7,295,671 B2 * | 11/2007 | Snell ...................... | 380/28 |
| 2003/0059054 A1 * | 3/2003 | Hu et al. ................. | 380/277 |
| 2006/0002549 A1 * | 1/2006 | Avasarala et al. ........ | 380/44 |

FOREIGN PATENT DOCUMENTS

WO WO 03101020 A1 * 12/2003

OTHER PUBLICATIONS

Advanced Encryption Standard (AES), United States' National Institute of Standards and Technology in Federal Information Processing Standards Publication 197, www.csrc.nist.gov, Nov. 26, 2001 [retrieved on Jan. 3, 2006] Retrieved from the Internet: <URL: http://csrc.nist.gov/publications/fips/fips197/fips-197.pdf> (51 pages).

(Continued)

*Primary Examiner*—Taghi T Arani
*Assistant Examiner*—Justin T Darrow
(74) *Attorney, Agent, or Firm*—Mendelsohn, Drucker & Associates, P.C.

(57) ABSTRACT

An apparatus for generating round-key words in accordance with a Rijndael algorithm. In one embodiment of the invention, the apparatus includes (a) a key expansion register block, having a key expansion register adapted to receive a final cipher key of a key expansion schedule in accordance with the Rijndael algorithm; (b) a round constant generator; (c) a first XOR adder adapted to add a first word of the key expansion register to a second word to generate and provide a first sum to the key expansion register block; (d) a transformation block adapted to generate a transformed word based on the first sum and the current round constant over four counts of a first cyclical counter; and (e) a second XOR adder adapted to add the transformed word to the first word of the key expansion register to generate and provide a second sum to the key expansion register block.

19 Claims, 4 Drawing Sheets

OTHER PUBLICATIONS

Definition of Advanced Encryption Standard, www.searchsecurity. com, 2006 [retrieved on Jan. 3, 2006] Retrieved from the Internet: <URL: http://searchsecurity.techtarget.com/sDefinition/0,,sid14_gci344759,00.html> (2 pages).

Definition of Rijndiel, www.searchsecurity.com, 2006 [retrieved on Jan. 3, 2006] Retrieved from the Internet: <URL: http://searchsecurity.techtarget.com/sDefinition/0,,sid14_gci523541,00.html> (2 pages).

"The Block Cipher Square," by Joan Daemen, Lars Knudsen, and Vincent Rijmen, 1997 [retrieved on Jan. 12, 2006]. Retrieved from the Internet: <URL: http://homes.esat.kuleuven.be/~cosicart/pdf/VR-9700.PDF>, pp. 1-17.

"A High Speed FPGA Implementation of Rijndael Algorithm," by Refik Sever et al., Proceedings of Euromicro Systems on Digital System Design (DSD'04), 2004, IEEE Computer Society (5 pages).

"A High-Throughput Low-Cost AES Processor," by Chih-Pin Su et al., Topics in Circuits for Communications, IEEE Communications Magazine, Dec. 2003, pp. 86-91.

"An Efficient 21.56GBPS AES Implementation on FPGA," by Xinmiao Zhang and Keshab K. Parhi, Department of Electrical Computer and Engineering, University of Minnesota, Minneapolis, MN, 2004, pp. 465-470.

"A Low-Cost FPGA Implementation of the Advanced Encryption Standard Algorithm," by Anderson Cattelan Zigiotto and Roberto D'Amore, Proceedings of the 15th Symposium on Integrated Circuits and Systems Design (SBCCI'02) 2002 IEEE Computer Society (6 pages).

* cited by examiner

101

KEY GENERATION FOR ADVANCED ENCRYPTION STANDARD (AES) DECRYPTION AND THE LIKE

TECHNICAL FIELD

The present invention relates to cryptography, and, in particular, to the decryption of information encrypted with a Rijndael-type algorithm, such as the Advanced Encryption Standard.

BACKGROUND

A symmetric cryptosystem is a method of encrypting (also called encoding) and decrypting (also called decoding) information involving the use of an identical secret key for both the encryption and decryption. The Rijndael algorithm, which is a substitution linear transformation block cipher, can support a symmetric cryptosystem. The Rijndael algorithm processes plain text in blocks of 128, 192, or 256 bits, and uses cipher keys of length 128, 192, or 256 bits. The Advanced Encryption Standard (AES) is a standardized implementation of the Rijndael algorithm used for securing sensitive material. The AES is defined by the United States' National Institute of Standards and Technology in Federal Information Processing Standards Publication 197, available at <http://csrc.nist.gov/publications/fips/fips197/fips-197.pdf; retrieved Jan. 3, 2006>, incorporated herein by reference in its entirety.

The AES algorithm, as currently defined, processes data in blocks sizes of 128 bits. Data block size is represented by Nb, where Nb is the number of 32-bit words in a block. Thus, for 128-bit blocks, Nb=4. The length of the cipher key used is represented by Nk, where Nk is the number of 32-bit words in the cipher key. The AES standard, as currently defined, allows use of cipher keys with lengths of 128 bits (wherein Nk=4), 192 bits (Nk=6), or 256 bits (Nk=8). A particular implementation of the AES standard must support at least one of the standard cipher key lengths. A block of unencrypted data (i.e., plaintext) is transformed over a series of rounds, where the number of rounds, represented by Nr, is dependent on the length of the cipher key. There are 10 rounds when using 128-bit keys, 12 when using 192-bit keys, and 14 when using 256-bit keys. The AES standard recognizes that, in the future, the specific values for key length, block size, and number of rounds are subject to change.

The working data block, or intermediate cipher result, of AES encryption and decryption is known as the State, and can be represented as a rectangular array of bytes having four rows and four columns of 8-bit bytes (for a total of 128 bits). The bytes can be viewed as finite field elements. They can be added and multiplied, but those operations are different from those used for numbers. For example, both addition and its inverse are implemented by performing an exclusive-OR (XOR) operation, while multiplication involves modulo reduction. Unless otherwise noted, references herein to addition mean the performance of an XOR operation. Similarly, adders referenced herein perform an XOR operation on the quantities added. Encryption and decryption start with the copying of a block of data into the State array, where the bytes will be transformed over the requisite number of rounds, and then the State's final value will be copied to a corresponding output block.

The AES algorithm takes the cipher key, and performs a key expansion routine to generate a key schedule with a total of Nb(Nr+1) 32-bit words, which are used for both encryption and decryption. Each round of encryption or decryption uses a different set of Nb words from the key schedule. The first Nk words, equivalent to one cipher key length, of the expanded key schedule are filled with the cipher key. Every subsequent word, w[i], is equal to the XOR of the previous word, i.e., w[i−1], and the word Nk positions earlier, i.e., w[i−Nk]. For words in positions that are a multiple of Nk, prior to the XOR with w[i−Nk], a transformation is applied to w[i−1], followed by an XOR with a 32-bit round constant, Rcon[i]. The above transformation consists of a cyclic shift (RotWord( )) of the bytes in the word, followed by the application of a table lookup substitution (SubWord( )) to all four bytes of the word. The key expansion routine for 256-bit cipher keys (Nk=8) is slightly different, wherein the SubWord( ) transform is also applied to w[i−1] prior to the XOR with w[i−Nk] when [i−4] is a multiple of Nk.

For both its encryption and decryption, the AES algorithm uses a round function that is composed of four different byte-oriented transformations: (1) byte substitution using a substitution table (S-box), (2) shifting rows of the State array by different offsets, (3) mixing the data within each column of the State array, and (4) adding a round key to the State.

Encryption starts with an initial stage in which an initial round key is added to the State. This initial stage is sometimes referred to as round zero. The initial stage is then followed by Nr rounds of transformations. The first Nr−1 rounds include the above four transformations, represented as SubBytes( ), ShiftRows( ), MixColumns( ), and AddRoundKey( ), respectively. The final round, i.e., round Nr, does not include the MixColumns( ) transformation. After the final round, the State, containing encrypted data (i.e., ciphertext), is copied to the output. Each round uses a new 128-bit round key, which is derived from the cipher key using a set of transformations as described above. Thus, a total of Nr+1 round keys are used in encrypting information under the AES standard. The size of the round key is dependent on the size of the State, which is 128 bits under the AES standard, and which differs from the size of the cipher key if, for example, the 192-bit or 256-bit cipher keys are used. If, for example, a 256-bit cipher key is used, then the key schedule is expanded until there are 60 words in the schedule, for each of the four words used as a round keys in the initial stage and the 14 rounds of encryption or decryption (i.e., 60=4*(1+14)).

Straightforward AES decryption uses the inverse transformations of the encryption transformations. The decryption algorithm involves the following sequence of transformations: (1) InvShiftRows( ), (2) InvSubBytes( ), (3) AddRoundKey( ) (since XOR is its own inverse), and (4) InvMixColumns( ). Like encryption, decryption proceeds for an initial stage followed by Nr rounds using the same Nr+1 round keys used for encryption; however, the round keys are used in reverse order, starting with the final round key of the key schedule, stepping backwards through the expanded key schedule, and ending with the initial round key. The expanded key schedule is created in the same way as in the encryption process. Decryption starts with the copying of a block of encrypted data (i.e., ciphertext) to the State and the addition of the final round key of the key schedule to the State. This is followed by Nr−1 identical rounds of transformation, which include the above four inverse transformations, and wherein the AddRoundKey( ) transformation steps backwards through the key schedule. The final round (round Nr) does not include the InvMixColumns( ) transformation.

The AES standard also provides an equivalent decryption process that allows a reordering of the inverse procedures based on commutative and distributive properties of combinations of the procedures, and which is particularly beneficial for systems that perform both encryption and decryption. The equivalent decryption process requires the transformation of the round keys for rounds 1 to Nr−1 using an InvMixColumns( ) procedure, which can be accomplished by using the expanded key schedule and transforming the appropriate round keys therein. The equivalent decryption process starts with the addition of the final round key, i.e., the last Nb words of the key expansion schedule, followed by Nr−1 identical rounds of InvSubBytes( ), InvShiftRows( ), InvMixColumns( ), and AddRoundKey( ) transformations, respectively, stepping backwards through the key expansion schedule. The final round does not include the InvMixColumns( ) transformation for the State. After the final round, the State, containing deciphered data (i.e., plaintext), is copied to the output.

Current approaches for implementing the AES-Rijndael algorithm in semiconductor devices typically use Nk·(Nr+1) registers to store the entire key expansion table on chip. This storage requires an undesirably large number of gates and consequent large chip area.

SUMMARY

In one embodiment, the invention is an apparatus for generating round-key words in accordance with a Rijndael algorithm. The apparatus comprises: (a) a key expansion register block, (b) a round constant generator, (c) a first XOR adder, (d) a transformation block, and (e) a second XOR adder. The key expansion register block comprises a key expansion register adapted to receive a final cipher key of a key expansion schedule in accordance with the Rijndael algorithm, and the key expansion register block is adapted to shift the contents of the key expansion register. The round constant generator is adapted to generate a current round constant based on a seed value and in response to a first control signal. The first XOR adder is adapted to add a first word of the key expansion register to a second word to generate and provide a first sum to the key expansion register block, wherein the first word of the key expansion register is a round-key word provided as an output of the apparatus, and the first sum comprises a first-sum first byte, a first-sum second byte, a first-sum third byte, and a first-sum fourth byte. The transformation block is adapted to generate a transformed word based on the first sum and the current round constant over four counts of a first cyclical counter. The second XOR adder is adapted to add the transformed word to the first word of the key expansion register to generate and provide a second sum to the key expansion register block.

In a second embodiment, the invention is an apparatus for generating round keys for the decryption of ciphertext, wherein the ciphertext was encrypted with a Rijndael algorithm using a first cipher key of a first key length. The apparatus comprises a multi-word shift register adapted to: (1) receive a second cipher key of the first key length, wherein the second cipher key is equivalent to the final segment of a key expansion schedule for the first cipher key, in accordance with the Rijndael algorithm, and (2) provide a first word in the shift register as a current key word for use in decrypting the ciphertext. The apparatus further comprises a first XOR adder adapted to combine the first word and a second word in the shift register to generate a first sum. The apparatus further comprises a first (2×1) mux adapted to receive the first sum at a first input, a first (4×1) mux adapted to receive a fourth byte of the first sum at a first input, a substitution box adapted to receive the output of the first (4×1) mux and perform a Rijndael byte-substitution transformation. The apparatus further comprises a round constant generator adapted to generate a current round constant value, a second XOR adder adapted to combine an output of the substitution box with the current round constant value to generate a second sum, a second (4×1) mux adapted to receive the output of the substitution box at a first input, a third (4×1) mux adapted to receive the output of the substitution box at a second input and a first byte of the first sum at a first input a fourth (4×1) mux adapted to receive the output of the substitution box at a third input and a second byte of the first sum at a first input, a fifth (4×1) mux adapted to receive the second sum at a fourth input and a third byte of the first sum at a first input. The apparatus further comprises a temporary register adapted to receive outputs from the second, third, fourth, and fifth muxes, wherein a second input of the first (4×1) mux receives a second byte from the temporary register, a third input of the first (4×1) mux receives a third byte from the temporary register, and a fourth input of the first (4×1) mux receives a fourth byte from the temporary register. The apparatus further comprises a third XOR adder adapted to combine the value stored in the temporary register and the current key word to generate a third sum, wherein a second input of the first (2×1) mux receives the third sum and the shift register receives an output of the first (2×1) mux.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In one embodiment, the present invention is an AES decryption system for the decryption of ciphertext into plaintext, which generates the requisite round keys on the fly during the rounds of decryption, rather than pre-computing and storing all of the round keys in an expanded key schedule as in the prior art. This on-the-fly key generation helps reduce the number of circuit elements in a decryption device since no additional elements are needed for the storage of the entire expanded key schedule. The overall decryption time may also be reduced since the decryption can start at approximately the same time as when the first block of ciphertext is received and does not have to wait for the entire key schedule to be expanded and stored. In addition, the generation of round keys is synchronized with the decryption of a block of ciphertext.

Figure 1:
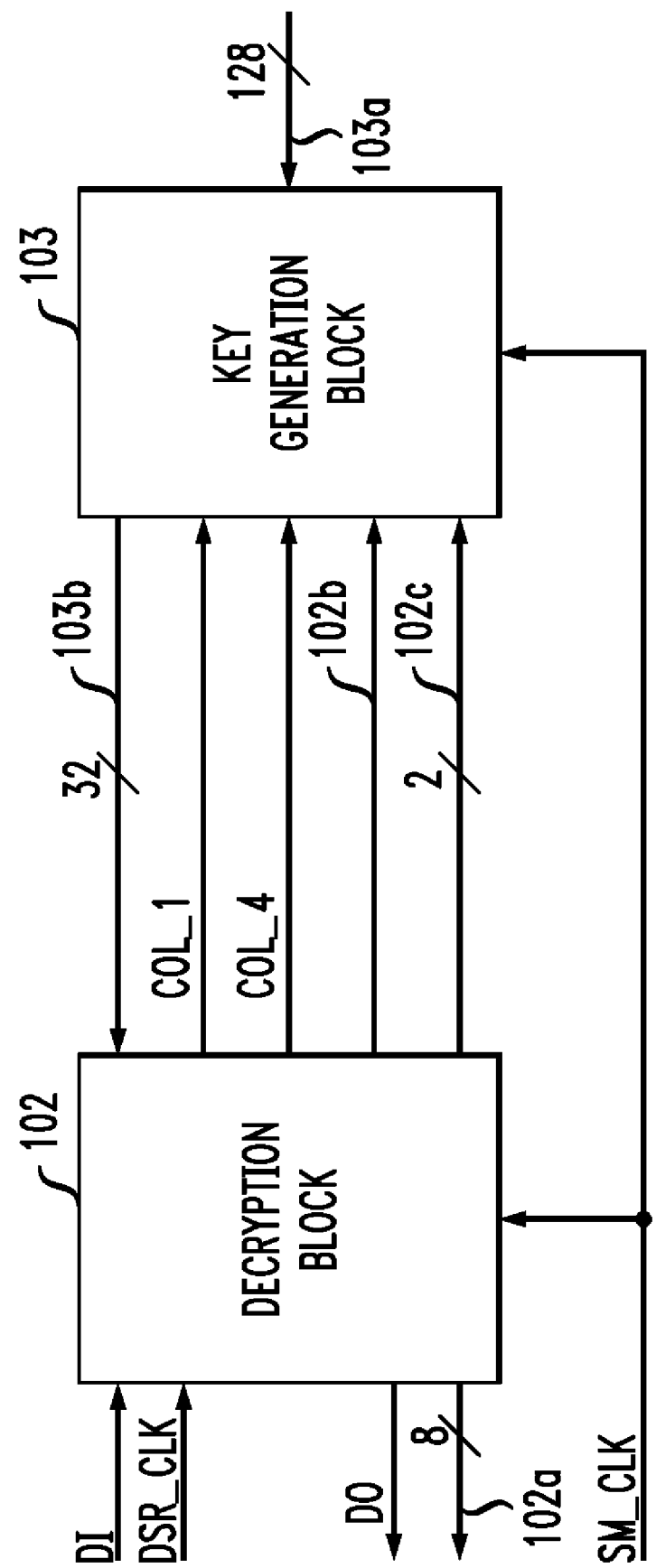
FIG. 1 shows a decryption unit according to one embodiment of the present invention.

FIG. 1 shows decryption unit 101, according to one embodiment of the present invention. In the figures, multi-bit signals are labeled as such either by a cross-hatch and a number indicating the bit width, or a label indicating the bit width; signals not so labeled can be assumed to be single-bit signals. In this embodiment, a 128-bit cipher key is used. Decryption unit 101 comprises decryption block 102 and decryption key generation block 103. Decryption block 102 performs the rounds of decryption needed to decrypt each block of ciphertext into plaintext using the straightforward inverse cipher (i.e., decryption) algorithm of the AES standard. Key generation block 103 performs the on-the-fly generation of round keys needed by decryption block 102 for each round of decryption.

Both decryption block 102 and key generation block 103 receive state machine (SM) clock SM_CLK. Decryption block 102 receives, from external sources, encrypted data (i.e., ciphertext) serially via data-in signal DI, and data shift register (DSR) clock DSR_CLK. SM_CLK and DSR_CLK do not need to be synchronized with each other and can be variously implemented with different relative frequencies. Preferably, the frequency of DSR_CLK is not so much higher than the frequency of SM_CLK so as to require pauses in the serial shifting in of the ciphertext, as explained more fully below.

Decryption block 102 receives from key generation block 103 key words for decryption via key word signal 103*b*. Decryption block 102 outputs, to external recipients, data-out signal DO, which outputs the received ciphertext (e.g. for debug purposes), and decrypt-out signal 102*a*, which provides decrypted data (i.e., plaintext) in 8-bit bursts. Decryption block 102 provides to key generation block 103 first-column control signal COL_1, final-column control signal COL_4, decrypt-start control signal 102*b*, and column-counter control signal 102*c*. These control signals are described in further detail below. The final round key from the corresponding encryption process is provided in parallel to key generation block 103 via cipher-key-in signal 103*a*.

Figure 2:
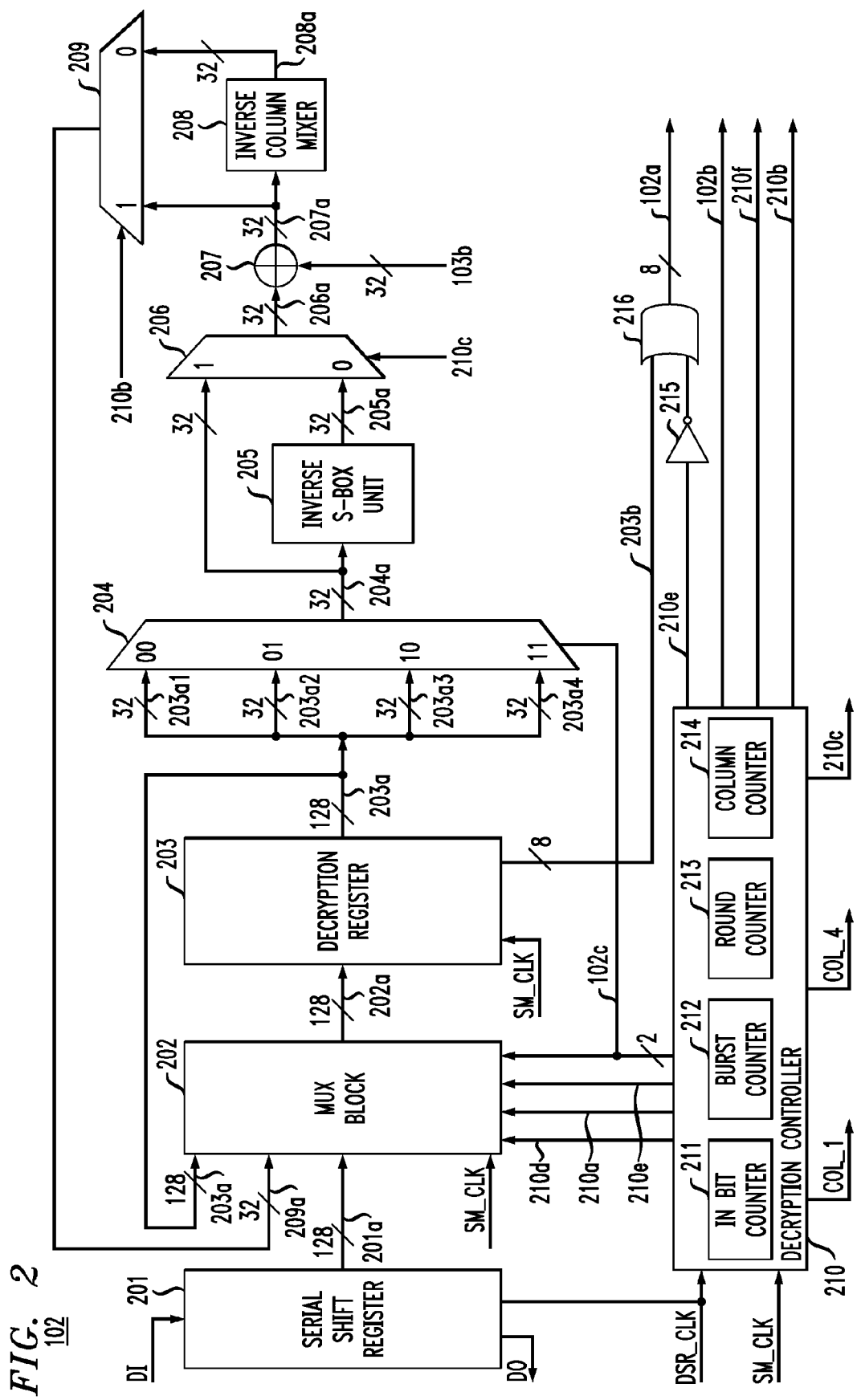
FIG. 2 shows a block diagram for the decryption block of the decryption unit of FIG. 1.

FIG. 2 shows a block diagram of decryption block 102 of decryption unit 101 of FIG. 1, which comprises units that perform the four inverse transformations of decryption. The InvShiftRows( ) transformation is performed by register control multiplexer block ("mux block") 202. The InvSubBytes( ) transformation is performed by inverse S-box unit 205. The AddRoundKey( ) transformation is performed by XOR adder 207, which receives the appropriate word of the round key from key generation block 103 via key-word signal 103*b*. The InvMixColumns( ) transformation is performed by inverse column mixer 208. Decryption controller 210 comprises counters and logic to generate various control signals for controlling the decryption and key generation processes. 128-bit decryption register 203 is used to store the State during the rounds of decryption. Thus, in the initial stage (also called round zero), decryption register 203 holds the ciphertext, and, after the final round, decryption register 203 holds the plaintext, which is burst out in 8-bit chunks via signal 203*b*. Additional components of decryption block 102 are used to shuttle data, as described in further detail below.

In particular, serial shift register 201 receives encrypted data serially via data input signal DI, regulated by DSR_CLK. In 128 clock cycles of DSR_CLK, serial shift register 201 gets one block of encrypted data. The encrypted data is serially shifted out via optional data-out signal DO, which can be used for testing or analysis of the data. If 128th-bit control signal 210*a* goes high, then the block of encrypted data in serial shift register 201 is provided in parallel, via mux block 202, to decryption register 203, which holds the State, via signals 201*a* and 202*a*. Normally, the ciphertext contains more than 128 bits of data and thus multiple 128-bit blocks are sequentially processed. In a preferred embodiment, data input signal DI continuously serially shifts ciphertext into serial shift register 201, without pause, and this data gets copied, as described above, to decryption register 203 every 128 bits. Thus, in order to avoid pauses in the serial shifting in of data into serial shift register 201, the entire process of decryption and bursting out of plaintext should be completed in no more than 128 cycles of DSR_CLK.

Mux block 202 performs the InvShiftRows( ) transformation of decryption, and also shifts down the decrypted data in decryption register 203 during the bursting out of the decrypted data, which occurs after the final round of decryption is completed. The AES standard calls for executing the InvShiftRows( ) transformation at the start of rounds one through ten. However, the InvShiftRows( ) transformation can alternatively be performed at the end of the initial stage, which immediately precedes round one, and at the end of rounds one through nine, which does not affect the actual sequence of inverse transformations performed in decryption, and is how mux block 202 of this implementation performs the InvShiftRows( ) transformation. An embodiment of mux block 202 can be implemented using logic circuits, such as cascading multiplexers, and its operation can be represented by the pseudo-code in Table I below, which, as is known in the art, can be used to generate standard code, such as register transfer language (RTL) code, which in turn can be used to generate a logic block to perform the requisite functions.

TABLE I

On falling edge of state machine clock SM_CLK do:
    {If (128th-bit control signal 210a is high) and (decryption-busy
        control signal 210f is low) then copy data in serial shift register
        201 to decryption register 203
    Else if burst-enable 210e is high then do
        {copy bits [127:8] of decryption register 203 to bit locations
[119:0] of decryption register 203
        copy '00000000' to bit locations [127:120] of
        decryption register 203
    }
    Else if column-counter 102c = '11' then
        copy the output of mux 209, via signal 209a, to bit locations
        [31:0] of decryption register 203
    Else if column-counter 102c = '10' then
        copy the output of mux 209, via signal 209a, to bit locations
        [63:32] of decryption register 203
    Else if column-counter 102c = '01' then
        copy the output of mux 209, via signal 209a, to bit locations
        [95:64] of decryption register 203
    Else if column-counter 102c = '00' then
        if final-round 210d high then
            copy the output of mux 209, via signal 209a, to bits
            [127:96] of decryption register 203
        else
            copy the values in the first column to the locations in the
            second column

| Copy this Value | To this Location of Decryption Register 203 |
|---|---|
| 209a [31:24] | 127:120 |
| 203a [23:16] | 119:112 |
| 203a [47:40] | 111:104 |
| 203a [71:64] | 103:96 |
| 203a [95:88] | 95:88 |
| 209a [23:16] | 87:80 |
| 203a [15:8] | 79:72 |
| 203a [39:32] | 71:64 |
| 203a [63:56] | 63:56 |
| 203a [87:80] | 55:48 |
| 209a [15:8] | 47:40 |
| 203a [7:0] | 39:32 |
| 203a [31:24] | 31:24 |
| 203a [55:48] | 23:16 |
| 203a [79:72] | 15:8 |
| 209a [7:0] | 7:0 |

}

The initial stage of the decryption is performed by bypassing InvSubBytes( ) and InvMixColumns( ) operations, and performing the AddRoundKey( ) operation, which is followed by the InvShiftRows( ) transformation for round one of the decryption. Then, in rounds one through nine, the data in decryption register 203 undergoes nine rounds of transformations by the four inverse transformations of decryption. In round ten (i.e., the final round), the InvShiftRows( ) transformation is skipped, having already been performed for round ten at the end of round nine, and the InvMixColumns( ) transformation is skipped as per the AES standard. Decryption controller 210 provides final-round control signal 210d to instruct mux block 202 to skip the InvShiftRows( ) operation at the end of the final round.

Mux block 202 provides the State in parallel to 128-bit decryption register 203 via signal 202a. Decryption register 203 provides the State to multiplexer 204 as four 32-bit words via parallel signals 203a1, 203a2, 203a3, and 203a4. Multiplexer 204 is controlled by 2-bit column-counter control signal 102c, whose values cycle backwards through '11,' '10,' '01,' and '00,' so that multiplexer 204 sequentially outputs, via 32-bit output 204a, each of the one-word columns of the State, as stored in decryption register 203. Signal 204a goes into the high input of multiplexer 206. Signal 204a also goes into 32-bit inverse S-box unit 205, where the InvSubBytes( ) operation is performed in parallel on each of the four bytes in the word. Inverse S-box unit 205 outputs the 32-bit result to the low input of multiplexer 206 via signal 205a. If initial-stage control signal 210c is high, then multiplexer 206 selects the high input (i.e., signal 204a) to output as 32-bit signal 206a, thereby skipping the InvSubBytes transformation during the initial stage; otherwise, multiplexer 206 selects the low input (i.e., signal 205a).

XOR adder 207 receives a 32-bit column of the State via signal 206a and a word of the round key via signal 103b and performs an addition operation on the words (i.e., performs an XOR operation). The result is output via 32-bit signal 207a to inverse column mixer 208 and to the high input of multiplexer 209. Inverse column mixer 208 performs the InvMixColumns( ) operation on the word of the State it receives via signal 207a, and outputs the result to the low input of multiplexer 209 via 32-bit signal 208a. If initial-stage/final-round signal 210b is high, then multiplexer 209 selects the high input (i.e., signal 207a) to output as 32-bit signal 209a; otherwise multiplexer 209 selects the low input (i.e., signal 208a). Thus, in the initial stage and in the final round, the State is not transformed by the InvMixColumns( ) operation. Signal 209a goes into mux block 202 and processed as described in Table I. Mux block 202 also receives 128-bit signal 203a, which is used to re-assert the words that were not selected by multiplexer 204 in the preceding clock cycle. Appropriate processing of the words by mux block 202, as per Table I, is controlled using column-counter control signal 102c.

Following the initial stage, the State is transformed over 10 rounds with the InvShiftRows( ), InvSubBytes( ), AddRoundKey( ), and InvMixColumns( ) operations as performed by mux block 202, inverse S-box unit 205, XOR adder 207, and inverse column mixer 208, respectively, and as controlled by decryption controller 210.

Decryption controller 210 comprises 8-bit in-bit counter 211, 4-bit burst counter 212, 4-bit round counter 213, and 2-bit column counter 214. Decryption controller 210 receives as inputs SM_CLK and DSR_CLK, whose cycles are variously counted by the counters of decryption controller 210. Decryption controller 210 also contains logic circuitry (not shown) to generate various output control signals based on the counters and clock signals.

Round counter 213 counts the rounds of decryption, resetting with every new block of ciphertext and with the end of the final round of decryption of every block of ciphertext. Round counter 213 increments by one every four cycles of state machine clock SM_CLK, since each decryption round takes four cycles. The output of round counter 213 is used to generate initial-stage control signal 210c indicating the initial stage, final-round control signal 210d indicating the final round, and initial-stage/final-round control signal 210b indicating the initial stage or final round.

Column counter 214 resets to '11' with every new block of ciphertext and decrements by one every cycle of SM_CLK, thereby returning to '11' every four cycles since it is a two-bit counter. The output of column counter 214 is 2-bit column counter control signal 102c. Column-counter signal 102c is used to generate 1-bit final-column control signal COL_4, which is high when column-counter signal 102c is '00,' and a first-column control signal COL_1, which is high when column-counter signal 102c is '11.'

Burst-enable control signal 210e goes high at substantially the same time as when final-round control signal 210d goes low, and burst-enable control signal 210e goes low when burst counter 212 is reset after its 16 cycles of counting bursts. 4-bit Burst counter 212, which is used in controlling the bursting out of plaintext from decryption register 203, starts counting after burst enable control signal 210e goes high, increments every cycle of SM_CLK, and resets after 16 cycles.

In-bit counter 211 counts the bits coming into shift register 201, incrementing with every cycle of DSR_CLK, and is used to determine when 128 data bits have shifted in, which in turn triggers 128th-bit control signal 210a, which in turn triggers decryption-busy control signal 210f and decrypt-start control signal 102b. There may be a slight lag in the triggering of decryption-busy control signal 210f and decrypt-start control signal 102b due to the operation of an optional synchronizer. Although 7 bits are sufficient to count 128 bits, an 8-bit counter is used in the preferred embodiment of in-bit counter 211, since that allows limiting tracking to only the most significant bit of in-bit counter 211, which flips every 128 bits, thereby triggering 128-th bit control signal 210a. 128th-bit control signal 210a goes high for one period of DSR_CLK (i.e. it is a pulse whose length is the period of DSR_CLK, thereby making it twice as wide as a single pulse of DSR_CLK) and causes mux block 202 to provide the values in serial shift register 201 to decryption register 203 via signals 201a and 202a. Decryption-busy signal 210f remains high until the end of the final decryption round. Decrypt-start signal 102b is pulsed (i.e., goes high for one SM_CLK cycle) at substantially the same time as decryption-busy signal 210f goes high. Initial-stage control signal 210c goes high one SM_CLK cycle after decrypt-start control signal 102b goes high.

Following the final decryption round (i.e., round 10, which is the eleventh round), decryption register 203 contains a block of deciphered data (i.e., plaintext). The deciphered data is piped out of decryption register 203 in 16 8-bit bursts via signal 203b, regulated by state machine clock SM_CLK. When burst-enable control signal 210e is high, mux block 202 shifts the contents of decryption register 203 by one byte on every cycle of state machine clock SM_CLK so that a new byte is output with every burst, as detailed in Table I. This shifting and bursting is enabled when burst-enable signal 210e from decryption controller 210 is high. Burst-enable signal 210e is also used to control OR gate 216 via inverter 215. If burst-enable signal 210e is low, then OR gate 216 receives a high signal, forcing decrypt-out signal 102a to be all ones, thereby reducing unnecessary signal fluctuation and enhancing system stability. If burst-enable signal 210e is high, then OR gate 216 outputs the 8-bit burst data it receives on input signal 203b via decrypt-out signal 102a. An optional frame-busy signal (not shown) may be generated by decryption controller 210 to go high substantially at the start of the initial stage of decryption of a block of ciphertext and go low substantially at the final byte of the corresponding plaintext is burst out. The optional frame-busy signal is useful in alternative embodiments where DSR_CLK is faster than SM_CLK to the extent that serial data shifting into serial shift register 201 needs to pause while awaiting the completion of decryption of the previous block of ciphertext and the bursting out of the corresponding plaintext.

Figure 3:
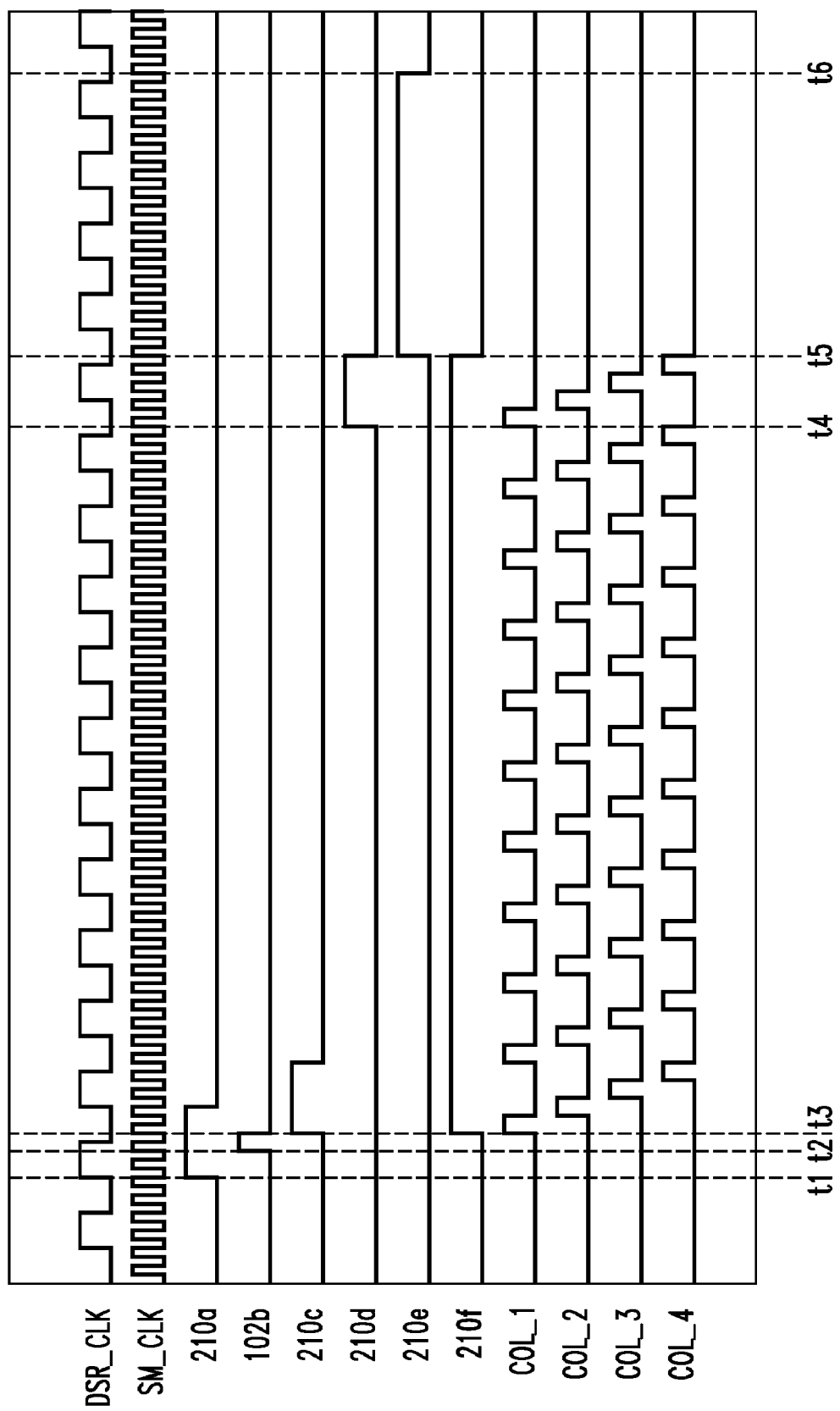
FIG. 3 shows an exemplary timing diagram showing clock signals input to and control signals generated by the decryption controller of FIG. 2 during the decryption of one 128-bit block of ciphertext and the bursting of the resulting 128-bit block of decrypted plaintext.

FIG. 3 shows an exemplary timing diagram showing clock signals input to and control signals generated by decryption controller 210 of FIG. 2 during the decryption of one 128-bit block of ciphertext and the bursting of the resulting 128-bit block of decrypted plaintext. In this example, the frequency of SM_CLK is four times that of DSR_CLK.

At time t1, 128th-bit control signal 210a goes high for a period equivalent to one cycle of DSR_CLK to indicate that the final bit of the current 128-bit block of ciphertext has been read into shift register 201.

At time t2, decrypt-start control signal 102b goes high for one cycle of SM_CLK to indicate the start of the decryption process for the current block of ciphertext. At the same time t2, decryption-busy control signal 210f goes high and stays high until the decryption process for the current block of ciphertext is complete (i.e., at time t5).

At time t3, initial-stage control signal 210c goes high and stays high during the initial stage, equivalent to four cycles of SM_CLK, after which time the processing of the initial stage is complete. At time t3, decryption controller internal signal COL_1 also goes high for one cycle of SM_CLK to indicate that the first column of the State is being processed. As shown in FIG. 3, internal signals COL_1, COL_2, COL_3, and COL_4 sequentially and repeatedly go high for one cycle of SM_CLK indicating that the first, second, third, and fourth columns, respectively, of the State are being processed. Each set of four columns corresponds to one of the eleven rounds of decryption processing. Note that, if 2-bit column-counter signal 102c is '11,' then COL_1 is high. Similarly, if column-counter signal 102c is '10,' then COL_2 is high; if column-counter signal 102c is '01,' then COL_3 is high; and lastly, if column-counter signal 102c is '00,' then COL_4 is high.

At time t4, final-round control signal 210d goes high and stays high during the final round, equivalent to four cycles of SM_CLK, until time t5, at which time the processing of the final stage is complete.

At time t5, decryption-busy control signal 210f goes low to indicate that the eleven rounds of decryption processing are complete. At the same time, burst-enable control signal 210e goes high and stays high for 16 cycles of SM_CLK, during which time the 16 bytes of decrypted plaintext are bursted out of decryption register 203, one 8-bit byte per SM_CLK cycle.

At time t6, burst-enable control signal 210e goes low to indicate the completion of the bursting of the current block of decrypted plaintext.

As represented in FIG. 3, the processing and lag involved in decrypting a 128-bit block of ciphertext and bursting out the resulting 128-bit block of decrypted plaintext takes about 63 cycles of SM_CLK (i.e., from time t1 to time t6). At a rate of one bit per DSR_CLK cycle, it takes 128 DSR_CLK cycles (i.e., 512 SM_CLK cycles) to read in each 128-bit block of ciphertext into shift register 201. As such, ciphertext can be continuously read into shift register 201 without exceeding the decryption processing speed.

Figure 4:
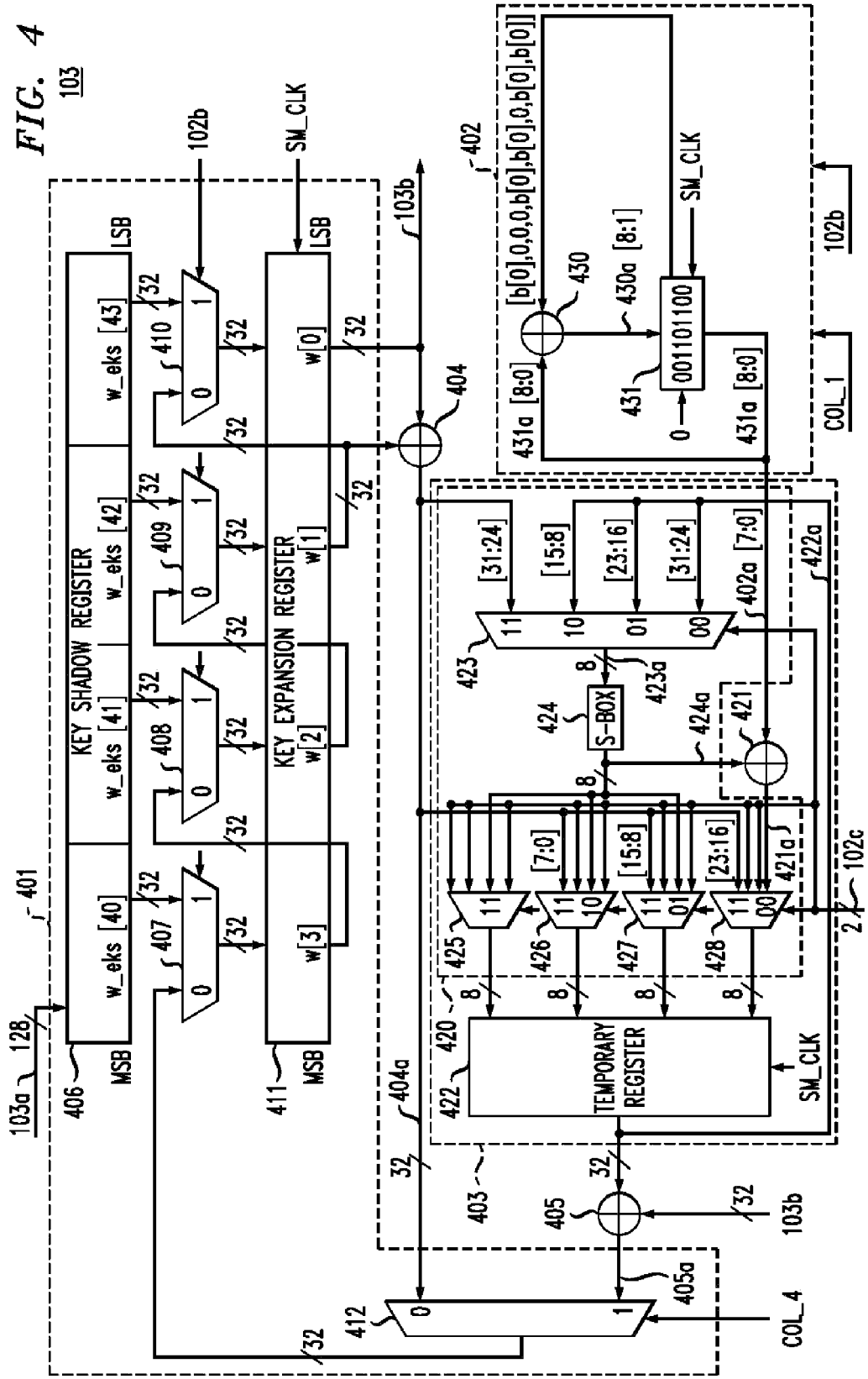
FIG. 4 shows a block diagram for the decryption key generation block of the decryption unit of FIG. 1.

FIG. 4 shows a block diagram of decryption key generation block 103 of decryption unit 101 of FIG. 1. Key generation block 103 provides key word signal 103b to XOR adder 207 in decryption block 102 of FIG. 2. Decryption key generation block 103 comprises key expansion register block 401, round constant generation block 402, transformation block 403, and XOR adders 404 and 405. Prior to the commencement of decryption of the first block of ciphertext, key shadow register 406, which is part of key expansion register block 401, receives and stores the round key of the final round of the encryption of the encrypted data, i.e. the final Nk words of the expanded key schedule, or their equivalent, if no expanded key schedule was used in the encryption. The final four words of the 44-word expanded key schedule, or their equivalent, are designated as w_eks[40], w_eks[41], w_eks[42], and w_eks[43] in shadow key register 406.

Key expansion register block 401 receives, shifts and stores within key expansion register 411 the words of the round keys, and further comprises and multiplexers 407, 408, 409, 410, and 412. The four 32-bit multiplexers 407, 408, 409, and 410 provide their outputs to the four 32-bit sections, designated w[3], w[2], w[1], and w[0], respectively, of 128-bit key expansion register 411, which polls the above four multiplexers on the rising edge of every cycle of state machine clock SM_CLK. If decrypt-start signal 102b, which is a control signal for 32-bit multiplexers 407, 408, 409, and 410, is high, then these four multiplexers output 32-bit words w_eks[40], w_eks[41], w_eks[42], and w_eks[43], respectively, of key shadow register 406. If decrypt-start signal 102b is low, then the above four multiplexers provide outputs as follows: (a) multiplexer 407 outputs the output of multiplexer 412 to w[3] of key expansion register 411, (b) multiplexer 408 outputs the previous value of w[3] to w[2], (c) multiplexer 409 outputs the previous value of w[2] to w[1], and (d) multiplexer 410 outputs the previous value of w[1] to w[0]. Thus, these four multiplexers are connected to operate, if decrypt-start signal 102b is low, so as to cascade words from multiplexer 412 down key expansion register 411.

The previous value of w[1] of key expansion register 411 is also output to XOR adder 404. The previous value of w[0] of key expansion register 411 is output to XOR adder 207 in decryption block 102 of FIG. 2 via key word signal 103b, and also to XOR adder 404. XOR adder 404 performs an XOR addition on 32-bit words w[0] and w[1] of key expansion register 411, and outputs the result as 32-bit signal 404a, which is provided to transformation block 403, which performs word rotation, non-linear substitution and round constant addition transformations.

In a departure from the methodology provided and suggested by the AES standard, transformation block 403 does not perform these transformations on a series of 32-bit words, but rather breaks up a 32-bit word into four 8-bit bytes and performs the needed transformations variously, as described below, on those four bytes over four cycles. Transformation block 403 comprises circuitry 420, which performs the word rotation and non-linear substitution transformations, XOR adder 421, which performs the round constant addition transformation, and temporary register 422.

Signal 404a is provided as the low input to multiplexer 412, and is also split up into four one-byte signals for provision to four multiplexers, wherein (a) the most significant byte, at bits 24-31, represented as [31:24] in FIG. 4, is provided to the '11' input of multiplexer 423, (b) the next significant byte [23:16] is provided to the '11' input of multiplexer 428, (c) the next significant byte [15:8] is provided to the '11' input of multiplexer 427, and (d) the least significant byte [7:0] is provided to the '11' input of multiplexer 426.

Multiplexer 412 is controlled by final-column signal COL_4, which is provided by decryption controller 210 of FIG. 2. If final-column signal COL_4 is low, then multiplexer 412 outputs signal 404a, which is received from XOR adder 404. If final-column signal COL_4 is high, then multiplexer 412 outputs signal 405a, which is received from XOR adder 405. Final-column signal COL_4 is high whenever 2-bit column-counter signal 102c is '00.' XOR adder 405 adds 32-bit key word provided by key-word signal 103b and the contents of 32-bit temporary register 422, provided via signal 422a. Temporary register 422 comprises four bytes and polls its four source multiplexers on the falling edge of every cycle of state machine clock SM_CLK. Multiplexer 425 provides its output to bit locations [7:0] of temporary register 422, mux 426 to locations [15:8], mux 427 to locations [23:16], and mux 428 to locations [31:24].

These four source multiplexers are controlled by column-counter signal 102c, providing outputs as shown by Table II below. Column-counter signal 102c is used in this implementation because of its convenience, and any appropriately adjusted cyclical counter would work. The maintenance of the previous outputs of the muxes, where noted in Table II, is preferably accomplished by feedback loops (not shown) from the corresponding segments of temporary register 422 to the particular input of the mux. Thus, for example, mux 425 would have its '00,' '01,' and '10' inputs connected to the output of location [7:0] of temporary register 422; mux 426 would have its '00,' and '01' inputs connected to the output of location [15:8] of temporary register 422; mux 427 would have its '00,' and '10' inputs connected to the output of location [23:16] of temporary register 422; and mux 428 would have its '01,' and '10' inputs connected to location [31:24] of temporary register 422.

XOR adder 421 adds signal 424a, i.e., the 8-bit output of S-box 424, with signal 402a, i.e., the 8-bit output of round constant generation block 402. Unlike the 32-bit round constants provided and suggested by the AES standard, key generation block 103 uses 8-bit round constants, which are generated by round constant generation block 402 as described below. S-box 424 performs the SubBytes( ) operation on 8-bit signal 423a, which is the output of multiplexer 423. Multiplexer 423 is controlled by column-counter signal 102c, providing outputs as follows: (a) if signal 102c is '11', then the output is bits [31:24] of signal 404a, (b) if signal 102c is '10', then the output is bits [15:8] of signal 422a, (c) if signal 102c is '01', then the output is bits [23:16] of signal 422a, and (d) if signal 102c is '00', then the output is bits [31:24] of signal 422a.

Round constant generation block 402 comprises 9-bit round constant register 431 and 9-bit XOR adder 430. Round constant register 431 is seeded with the value '001101100' at the start of the decryption of every block, which depends on decrypt-start signal 102b. Round constant register 431 refreshes on the downtick of SM_CLK if column-counter signal 102c is '11', i.e., if COL_1 is high. In particular, if COL_1 is high, then bits [8:1] of output 430a of XOR adder 430 go into bits [7:0] of round constant register 431, and the most significant bit (MSB) of round constant register 431, bit [8], is set to zero. XOR adder 430 adds the value of round constant register 431 with a 9-bit number created using b[0], i.e., the least significant bit (LSB), of round constant register 431, wherein the created 9-bit number is [b[0],0,0,0,b[0], b[0],0, b[0], b[0]]. Thus if b[0] is 0, then the created number is '000000000', and if b[0] is 1, then the created number is '100011011'. The 8-bit output of round constant generation block 402, i.e., signal 402a, is equivalent to the 8 least significant bits, i.e., bits [7:0], of signal 431a, the 9-bit output of round constant register 431, thus, dropping the MSB of signal 431a creates signal 402a.

The operation of decryption key generation block 103 is further described in Table III, below, which illustrates approximate times when registers 406, 411, 422, and 431 are updated, and the values with which they are updated, for the initial stage and rounds one and ten. In the table, SM_CLK cycle counts the cycles of SM_CLK starting with the one corresponding to the uptick of decrypt-start control signal 102b, the term Sbox(x) refers to the output of S-box 424 when its input is x, the term y[a:b] refers to bits a-b of y, { } are used to enclose sums of XOR addition, and w_eks[n] refers to a word equivalent to word n of an expanded key schedule for the cipher key in accordance with the AES standard (the negative values of n used in Table III represent words past the start of the schedule, however, those words are not used for decryption, do not need to be generated, and can be ignored).

TABLE II

| Column-counter signal 102c | Mux 425 Output | Mux 426 Output | Mux 427 Output | Mux 428 Output |
| --- | --- | --- | --- | --- |
| '11' (COL_1) | 424a, output of S-box 424 | bits [7:0] of 404a, output of XOR adder 404 | bits [15:8] of 404a, output of XOR adder 404 | bits [23:16] of 404a, output of XOR adder 404 |
| '10' (COL_2) | maintain previous output | 424a, output of S-box 424 | maintain previous output | maintain previous output |
| '01' (COL_3) | maintain previous output | maintain previous output | 424a, output of S-box 424 | maintain previous output |
| '00' (COL_4) | maintain previous output | maintain previous output | maintain previous output | 421a, output of XOR adder 421 |

TABLE III

| SM_CLK cycle | Round | Col. counter | Operations include: |
| --- | --- | --- | --- |
| — | — | — | final set of expanded key schedule words (i.e., w_eks[40], w_eks[41], w_eks[42], and w_eks[43]) are loaded into key shadow register 406. |
| 1 | — | — | UPTICK: decrypt-start control signal 102b goes high; DOWNTICK: Round constant register populated with seed value |
| 2 | 0 (Initial stage) | 11 | UPTICK: data transferred from key shadow register 406 to key expansion register 411; COL_1 goes high; decrypt-start control 102b goes low. DOWNTICK: Sbox({w_eks[43] ⊕ w_eks[42]} [31:24]) input to 422[7:0]; {w_eks[43] ⊕ w_eks[42]} [7:0] input to 422[15:8]; |

TABLE III-continued

| SM_CLK cycle | Round | Col. counter | Operations include: |
|---|---|---|---|
| | | | {w_eks[43] ⊕ w_eks[42]} [15:8] input to 422[23:16]; {w_eks[43] ⊕ w_eks[42]} [23:16] input to 422[31:24]; New round constant value input to 431. |
| 3 | 0 | 10 | UPTICK: w_eks[42] shifted to w[0], w_eks[41] shifted to w[1], w_eks[40] shifted to w[2], {w_eks[42] ⊕ w_eks[43]} (=w_eks[39]) shifted to w[3]; COL_1 goes low; COL_2 goes high. DOWNTICK: Sbox(422[15:8]) input to 422[15:8]. |
| 4 | 0 | 01 | UPTICK: w_eks[41] shifted to w[0], w_eks[40] shifted to w[1], w_eks[39] shifted to w[2], {w_eks[41] ⊕ w_eks[42]} (=w_eks[38]) shifted to w[3]; COL_2 goes low; COL_3 goes high. DOWNTICK: Sbox(422[23:16]) input to 422[23:16]. |
| 5 | 0 | 00 | UPTICK: w_eks[40] shifted to w[0], w_eks[39] shifted to w[1], w_eks[38] shifted to w[2], {w_eks[40] ⊕ w_eks[41]} (=w_eks[37]) shifted to w[3]; COL_3 goes low; COL_4 goes high. DOWNTICK: {Sbox(422[31:24]) ⊕ round-constant[7:0]} input to 422[31:24]. |
| 6 | 1 | 11 | UPTICK: w_eks[39] shifted to w[0], w_eks[38] shifted to w[1], w_eks[37] shifted to w[2], {422 ⊕ w_eks[40]} (=w_eks[36]) shifted to w[3]; COL_4 goes low; COL_1 goes high. DOWNTICK: Sbox({w_eks[39] ⊕ w_eks[38]} [31:24]) input to 422[7:0]; {w_eks[39] ⊕ w_eks[38]} [7:0] input to 422[15:8]; {w_eks[39] ⊕ w_eks[38]} [15:8] input to 422[23:16]; {w_eks[39] ⊕ w_eks[38]} [23:16] input to 422[31:24]; New round constant value input to 431. |
| 7 | 1 | 10 | UPTICK: w_eks[38] shifted to w[0], w_eks[37] shifted to w[1], w_eks[36] shifted to w[2], {w_eks[38] ⊕ w_eks[39]} (=w_eks[35]) shifted to w[3]; COL_1 goes low; COL_2 goes high. DOWNTICK: Sbox(422[15:8]) input to 422[15:8]. |
| 8 | 1 | 01 | UPTICK: w_eks[37] shifted to w[0], w_eks[36] shifted to w[1], w_eks[35] shifted to w[2], {w_eks[37] ⊕ w_eks[38]} (=w_eks[34]) shifted to w[3]; COL_2 goes low; COL_3 goes high. DOWNTICK: Sbox(422[23:16]) input to 422[23:16]. |
| 9 | 1 | 00 | UPTICK: w_eks[36] shifted to w[0], w_eks[35] shifted to w[1], w_eks[34] shifted to w[2], {w_eks[36] ⊕ w_eks[37]} (=w_eks[33]) shifted to w[3]; COL_3 goes low; COL_4 goes high. DOWNTICK: {Sbox(422[31:24]) ⊕ round-constant[7:0]} input to 422[31:24]. |
| 10 | 2 | 11 | UPTICK: w_eks[35] shifted to w[0], w_eks[34] shifted to w[1], w_eks[33] shifted to w[2], {422 ⊕ w_eks[36]} (=w_eks[32]) shifted to w[3]; COL_4 goes low; COL_1 goes high. DOWNTICK: Sbox({w_eks[35] ⊕ w_eks[34]} [31:24]) input to 422[7:0]; {w_eks[35] ⊕ w_eks[34]} [7:0] input to 422[15:8]; {w_eks[35] ⊕ w_eks[34]} [15:8] input to 422[23:16]; {w_eks[35] ⊕ w_eks[34]} [23:16] input to 422[31:24]; New round constant value input to 431. |
| 42 | 10 | 11 | UPTICK: w_eks[3] shifted to w[0], w_eks[2] shifted to w[1], w_eks[1] shifted to w[2], {422 ⊕ w_eks[4]} (=w_eks[0]) shifted to w[3]; COL_4 goes low; COL_1 goes high. DOWNTICK: Sbox({w_eks[3] ⊕ w_eks[2]} [31:24]) input to 422[7:0]; {w_eks[3] ⊕ w_eks[2]} [7:0] input to 422[15:8]; {w_eks[3] ⊕ w_eks[2]} [15:8] input to 422[23:16]; {w_eks[3] ⊕ w_eks[2]} [23:16] input to 422[31:24]; New round constant value input to 431. |
| 43 | 10 | 10 | UPTICK: w_eks[2] shifted to w[0], w_eks[1] shifted to w[1], w_eks[0] shifted to w[2], {w_eks[2] ⊕ w_[3]} (=w_eks[-1]) shifted to w[3]; COL_1 goes low; COL_2 goes high. DOWNTICK: Sbox(422[15:8]) input to 422[15:8]. |
| 44 | 10 | 01 | UPTICK: w_eks[1] shifted to w[0], w_eks[0] shifted to w[1], w_eks[-1] shifted to w[2], {w_eks[1] ⊕ w_eks[2]} (=w_eks[-2]) shifted to w[3]; COL_2 goes low; COL_3 goes high. DOWNTICK: Sbox(422[23:16]) input to 422[23:16]. |
| 45 | 10 | 00 | UPTICK: w_eks[0] shifted to w[0], w_eks[-1] shifted to w[1], w_eks[-2] shifted to w[2], {w_eks[0] ⊕ w_eks[1]} (=w_eks[-3]) shifted to w[3]; COL_3 goes low; COL_4 goes high. DOWNTICK: {Sbox(422[31:24]) ⊕ round-constant[7:0]} input to 422[31:24]. |

Decryption key generation block 103 generates one key word for decryption block 102 on every cycle of state machine clock SM_CLK, following the initial population of expansion register 411. Thus, 45 cycles would be needed for on-the-fly round key generation using a 128-bit cipher key, 53 cycles using a 192-bit cipher key, and 61 cycles using a 256-bit cipher key. Alternative implementations may require additional clock cycles. As described earlier with reference to FIG. 3, the processing speed of decryption block 102 is limited by the 512 cycles of SM_CLK that it takes to read in each 128-bit block of cyphertext into serial shift register 201. Thus, the words of the decryption round keys can be generated on-the-fly by key generation block 103 without adversely affecting the decryption processing speed of decryption block 102. In the period after the final round of decryption but before the initial stage of the next block of data, key generation block 103 can continue to operate as its output will be ignored, but preferably key generation block 103 enters a reduced operation mode to conserve power. Likewise, decryption block 102 preferably enters a reduced operation mode in the period after burst-enable control signal 210e goes low and before the initial stage of the next block of data.

A preferred embodiment of the present invention has been described. Numerous variations and equivalent implementations, which would be known to a person of ordinary skill in the art of digital circuit design, are possible without departing from the teachings of the present invention. For example, the numbering of bits, bytes, and/or words and their designations as least significant or most significant is reversible without affecting the operation of the described embodiment, or of other embodiments of the present invention. For another example, decryption register 203 can burst out its data through wider or narrower output paths, that would then require correspondingly fewer or more clock cycles to burst out.

In the preferred embodiment, control signals based on 2-bit column counter 214 are used as control signals by components of decryption key generation block 103 since they operate in four-count cycles. In alternative embodiments with different data block and/or cipher key sizes, components of decryption key generation block 103 may require control signals based on cyclical counters other than the column counter for proper operation.

In an alternative embodiment, a 192-bit cipher key is used. The structure of decryption block 102 can remain substantially the same, although round counter 213 would count to 12 instead of 10. Decryption key generation block 103 would have key shadow register 406 and key expansion register 411 expanded to 192 bits, in order to receive the final six words of the key expansion table, or equivalent, from the encryption, use a different seed value for round constant register 431, have two additional multiplexers in the cascade between the two registers, have control signals based on different counters, and some additional and/or modified components and logic, as known to a person of ordinary skill in the art, needed for proper operation in accordance with the AES standard.

In an alternative embodiment, a 256-bit cipher key can be used, which would require modifications such as (a) going to round 14, (b) 256-bit key registers in decryption key generation block 103 in order to receive the final eight words of the key expansion table, or their equivalent, from the encryption, (c) four additional cascade multiplexers between the registers, compared to the 128-bit embodiment, (d) a different seed value for round constant register 431, (e) control signals based on additional counters, and (f) some additional circuit adjustments, as known to a person of ordinary skill in the art, to account for the variation, described above, in the key expansion routine using 256-bit cipher keys, and for proper operation in accordance with the AES standard.

In an alternative embodiment, key generation block 103 is used to populate a key expansion table, whose values, in turn, are used by a decryption block similar to decryption block 102. This alternative embodiment would need registers to store the key expansion table and additional logic, known to one of ordinary skill in the art, to provide the appropriate word of the key expansion table to the decryption block when needed.

In an alternative embodiment, decryption block 102 is arranged to use the equivalent inverse cipher algorithm of the AES standard, with requisite modifications to decryption block 102, as are known to one of ordinary skill in the art. Such modifications would include re-arrangements of the components of decryption block 102, and applying the InvMixColumns( ) transformation in rounds 1 through Nr−1 to the key words received from key generation block 103 via signal 103b. In a further alternative embodiment, decryption block 102 is arranged using another equivalent inverse cipher algorithm, with requisite modifications to decryption block 102, as are known to one of ordinary skill in the art. Such modifications would include re-arrangements of the components of decryption block 102, and application of any necessary transformation in rounds 1 through Nr−1 to the key words received from key generation block 103 via signal 103b.

In an alternative embodiment, decryption unit 101 is configured to decrypt ciphertext encrypted using other variations of the Rijndael algorithm. Thus, decryption unit 101 can be modified to handle data block sizes of 192 bits or 256 bits. This would require modifications, known to one of ordinary skill in the art, to decryption block 102 to allow it to handle the different data block sizes, such as increasing the sizes of registers 201 and 203, expanding multiplexer 204, expanding mux block 202, and modifying the logic and counters of decryption controller 210. Decryption key generation block 103 can remain substantially unchanged for 128-bit cipher keys, and modified as described above for 192-bit and 256-bit cipher keys, with appropriate counter modifications, as necessary. In an alternative embodiment, decryption unit 101 can be modified to handle any cipher key size that is a multiple of 32 bits and any data block size that is a multiple of 32 bits by modifications similar to those described above for handling data block sizes other than 128 bits and cipher key sizes other than 128 bits.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. Apparatus for generating round-key words in accordance with a Rijndael algorithm, the apparatus comprising:
    (a) a key expansion register block comprising a key expansion shift register adapted to receive a first cipher key of a key expansion schedule in accordance with the Rijndael algorithm, wherein the key expansion register block is adapted to shift the contents of the key expansion shift register;
    (b) a round constant generator adapted to generate a current round constant based on a seed value and in response to a first control signal;
    (c) a first XOR adder adapted to add a first word of the key expansion shift register to a second word to generate and provide a first sum to the key expansion register block, wherein:
        the first word of the key expansion shift register is a round-key word provided as an output of the apparatus; and
        the first sum comprises a first-sum first byte, a first-sum second byte, a first-sum third byte, and a first-sum fourth byte;
    (d) a transformation block adapted to generate a transformed word based on the first sum and the current round constant over four counts of a first cyclical counter; and
    (e) a second XOR adder adapted to add the transformed word to the first word of the key expansion shift register to generate and provide a second sum to the key expansion register block;
    wherein the round constant generator comprises:
        a round constant register adapted to store 9 bits and to refresh in response to the first control signal; and
        a third XOR adder, adapted to add the value of the contents of the round constant register to a first generated number, and to provide a portion of the resultant fourth sum to the round constant register.

2. The apparatus of claim 1, wherein, during each count of the first cyclical counter, a non-linear substitution is performed on a different byte of the first sum.

3. The apparatus of claim 1, wherein the transformation block comprises:
    (1) first circuitry comprising a substitution box adapted to perform a non-linear substitution on a first current portion of a 32-bit word, wherein the first circuitry is adapted to perform a rotation of bytes in a word;
    (2) a fourth XOR adder adapted to add the current round constant to a second current portion of a 32-bit word and output a third sum; and
    (3) a temporary register adapted to hold 32 bits, comprising a first byte, a second byte, a third byte, and a fourth byte.

4. The apparatus of claim 3, wherein:
    the first current portion of a 32-bit word is an 8-bit byte;
    the current round constant is an 8-bit byte; and
    the second current portion of a 32-bit word is an 8-bit byte.

5. The apparatus of claim 3, wherein the first circuitry is adapted to receive a counter control signal based on the first cyclical counter, wherein the counter control signal's values comprise a first count, a second count, a third count, and a fourth count, and the transformation block is further adapted to operate such that:
    (1) on the first count, the substitution box transforms the first-sum fourth byte and provides the output to the first byte of the temporary register;
    (2) on the second count, the substitution box transforms the first-sum first byte and provides the output to the second byte of the temporary register;
    (3) on the third count, the substitution box transforms the first-sum second byte and provides the output to the third byte of the temporary register; and
    (4) on the fourth count, the substitution box transforms the first-sum third byte and provides the output to the fourth XOR adder, which adds it to the current round constant, and provides the third sum to the fourth byte of the temporary register, wherein the contents of the temporary register is provided to the second XOR adder as the transformed first sum.

6. The apparatus of claim 3, wherein the first circuitry further comprises:
    a first (4×1) multiplexer adapted to receive: the fourth byte of the first sum at a first input, the second, third, and fourth bytes of the temporary register at a second, third, and fourth input, respectively;
    a second (4×1) multiplexer adapted to receive: the output of the substitution box at a first input, and the first byte of the temporary register at a second, third, and fourth input;
    a third (4×1) multiplexer adapted to receive: the first byte of the first sum at a first input, the output of the substitution box at a second input, and the second byte of the temporary register at a third, and fourth input;
    a fourth (4×1) multiplexer adapted to receive: the second byte of the first sum at a first input, the output of the substitution box at a third input, and the third byte of the temporary register at a second, and fourth input;
    a fifth (4×1) multiplexer adapted to receive: the third byte of the first sum at a first input, the third sum at a fourth input, and the fourth byte of the temporary register at a second and third input.

7. The apparatus of claim 6, wherein each multiplexer is controlled by the counter control signal.

8. The apparatus of claim 1, wherein the first generated number is a nine-bit number generated using the least significant bit (LSB) of the round constant register, such that if the LSB is '0,' then the first generated number is '000000000,' and if the LSB is '1,' then the first generated number is '100011011.'

9. The apparatus of claim 1, wherein:
the portion of the fourth sum provided to the round constant register comprises the eight most significant bits of the fourth sum;
the portion of the fourth sum is provided to the eight least significant bits of the round constant register, and the most significant bit of the round constant register is set to zero; and
the round constant generator provides as the current round constant the 8 least significant bits of the round constant register.

10. The apparatus of claim 1, wherein the current output of the apparatus is provided to a decryption block adapted to decrypt ciphertext on-the-fly, in accordance with the Rijndael algorithm.

11. The apparatus of claim 1, wherein the current output of the apparatus is provided to an key expansion schedule register adapted to store the key expansion schedule for the first cipher key and data of a first block size, in accordance with the Rijndael algorithm.

12. The apparatus of claim 1, wherein the key expansion register block further comprises a selector adapted to receive a second control signal and to provide to the key expansion shift register the first sum if the second control signal indicates a first value, and to provide to the key expansion shift register the second sum if the second control signal indicates a second value.

13. The apparatus of claim 1, including a controller comprising:
(a) the first cyclical counter;
(b) a second cyclical counter adapted to cyclically count to Nk, where Nk is equal to the number of 32-bit words in a first key length, wherein the first and second cyclical counters are used to generate the first control signal and the second control signal;
(c) a data block counter adapted to generate a decryption start control signal, wherein:
the decryption start control signal indicates the start of each block of data of the first block size; and
the key expansion shift register is refreshed with the second cipher key based on the decryption start control signal; and
(d) a state machine clock adapted to generate a state machine clock signal.

14. The apparatus of claim 13, wherein the key expansion register block further comprises:
a selector adapted to receive the second control signal, and to provide to the key expansion shift register the first sum if the second control signal indicates a first value, and to provide to the key expansion shift register the second sum if the second control signal indicates a second value;
a key shadow register adapted to receive and hold the first cipher key;
a first (2×1) multiplexer adapted to receive the output of the selector at a first input and a first portion of the key shadow register at a second input, to select an input based on a decryption start control signal (e.g. 102b), and to provide the selected input to a fourth word of the key expansion shift register;
a second (2×1) multiplexer adapted to receive the fourth word of the key expansion shift register at a first input and a second portion of the key shadow register at a second input, to select an input based on the decryption start control signal, and to provide the selected input to a third word of the key expansion shift register;
a third (2×1) multiplexer adapted to receive the third word of the key expansion shift register at a first input and a third portion of the key shadow register at a second input, to select an input based on the decryption start control signal, and to provide the selected input to the second word of the key expansion shift register; and
a fourth (2×1) multiplexer adapted to receive the second word of the key expansion shift register at a first input and a fourth portion of the key shadow register at a second input, to select an input based on the decryption start control signal, and to provide the selected input to the first word of the key expansion shift register;
wherein the key expansion shift register is adapted to refresh with every cycle of the state machine clock signal.

15. Apparatus for generating round keys for the decryption of ciphertext, wherein the ciphertext was encrypted with a Rijndael algorithm using a first cipher key of a first key length, the apparatus comprising:
a multi-word shift register adapted to:
(1) receive a second cipher key of the first key length, wherein the second cipher key is equivalent to the final segment of a key expansion schedule for the first cipher key, in accordance with the Rijndael algorithm; and
(2) provide a first word in the shift register as a current key word for use in decrypting the ciphertext;
a first XOR adder adapted to combine the first word and a second word in the shift register to generate a first sum;
a first (2×1) multiplexer adapted to receive the first sum at a first input;
a first (4×1) multiplexer adapted to receive a fourth byte of the first sum at a first input;
a substitution box adapted to receive the output of the first (4×1) multiplexer and perform a Rijndael byte-substitution transformation;
a round constant generator adapted to generate a current round constant value
a second XOR adder adapted to combine an output of the substitution box with the current round constant value to generate a second sum;
a second (4×1) multiplexer adapted to receive the output of the substitution box at a first input;
a third (4×1) multiplexer adapted to receive the output of the substitution box at a second input and a first byte of the first sum at a first input;
a fourth (4×1) multiplexer adapted to receive the output of the substitution box at a third input; and a second byte of the first sum at a first input;
a fifth (4×1) multiplexer adapted to receive the second sum at a fourth input and a third byte of the first sum at a first input;
a temporary register adapted to receive outputs from the second, third, fourth, and fifth multiplexers, wherein:
a second input of the first (4×1) multiplexer receives a second byte from the temporary register;
a third input of the first (4×1) multiplexer receives a third byte from the temporary register; and a fourth input of the first (4×1) multiplexer receives a fourth byte from the temporary register; and a third XOR adder adapted to combine the value stored in the temporary register and the current key word to generate a third sum, wherein:

a second input of the first (2×1) multiplexer receives the third sum; and the shift register receives an output of the first (2×1) multiplexer.

16. The apparatus of claim 15, wherein each multiplexer is controlled by a column control signal generated based on a two-bit column counter, wherein the column control signal's values comprise a first column, a second column, a third column, and a fourth column.

17. The apparatus of claim 16, wherein:

the first (2×1) multiplexer selects (i) the first input value for the first, second, and third columns and (ii) the second input value for the fourth column.

18. The apparatus of claim 16, wherein:

(a) the second (4×1) multiplexer selects (i) the first input for the first column and (ii) the first byte from the temporary register for the second, third, and fourth columns;

(b) the third (4×1) multiplexer selects (i) the first input for the first column, (ii) the second input for the second column, and (iii) the second byte from the temporary register for the third and fourth columns;

(c) the fourth (4×1) multiplexer selects (i) the first input for the first column, (ii) the third input for the third column, and (iii) the third byte from the temporary register for the second and fourth columns;

(d) the fifth (4×1) multiplexer selects (i) the first input for the first column, (ii) the fourth input for the fourth column, and (iii) the fourth byte from the temporary register for the second and third columns.

19. The apparatus of claim 15, wherein the apparatus further comprises a decryption block adapted to decrypt the ciphertext using the current key word.

* * * * *